United States Patent
Chien (10) Patent No.: US 10,684,473 B2
(45) Date of Patent: Jun. 16, 2020

(54) ANGLE-ADJUSTING MECHANISM OF HEAD-UP DISPLAY

(71) Applicants: LITE-ON ELECTRONICS (GUANGZHOU) LIMITED, Guangzhou (CN); LITE-ON TECHNOLOGY CORPORATION, Taipei (TW)

(72) Inventor: Hung-Chang Chien, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 71 days.

(21) Appl. No.: 15/977,049

(22) Filed: May 11, 2018

(65) Prior Publication Data

US 2019/0196193 A1 Jun. 27, 2019

Related U.S. Application Data

(60) Provisional application No. 62/609,360, filed on Dec. 22, 2017.

(30) Foreign Application Priority Data

Mar. 14, 2018 (CN) .......................... 2018 1 0210329

(51) Int. Cl.
*G02B 27/01* (2006.01)
*F16H 25/20* (2006.01)
(Continued)

(52) U.S. Cl.
CPC ......... *G02B 27/0149* (2013.01); *F16H 25/20* (2013.01); *G02B 7/1821* (2013.01);
(Continued)

(58) Field of Classification Search
CPC .............. G02B 7/1821; G02B 27/0149; G02B 27/0179
(Continued)

(56) References Cited

U.S. PATENT DOCUMENTS 3,427,861 A * 2/1969 Maley .................... G01N 25/72
374/5
7,280,282 B2 * 10/2007 Kageyama ......... G02B 27/0101
359/630

(Continued)

FOREIGN PATENT DOCUMENTS

CN 204883051 U 12/2015
TW M550407 U 10/2017

OTHER PUBLICATIONS

TIPO Office Action dated Oct. 19, 2018 in Taiwan application (No. 107108656).

*Primary Examiner* — Ricky D Shafer
(74) *Attorney, Agent, or Firm* — McClure, Qualey & Rodack, LLP (57) ABSTRACT

An angle-adjusting mechanism is provided. The angle-adjusting mechanism includes a reflecting assembly, a transmission assembly and a driving unit. The reflecting assembly includes a reflecting plate. The transmission assembly includes a transmission rod and a connecting element disposed on the transmission rod. The transmission assembly is connected to the reflecting assembly via the connecting element. The driving unit is configured to drive the transmission rod to move the reflecting assembly.

9 Claims, 12 Drawing Sheets

(51) Int. Cl.
*G02B 7/182* (2006.01)
*B60K 35/00* (2006.01)

(52) U.S. Cl.
CPC .......... *G02B 27/0179* (2013.01); *B60K 35/00* (2013.01); *B60K 2370/334* (2019.05); *F16H 2025/209* (2013.01); *G02B 2027/015* (2013.01); *G02B 2027/0159* (2013.01); *G02B 2027/0181* (2013.01)

(58) Field of Classification Search
USPC ........................................ 359/631, 632, 877
See application file for complete search history.

(56) References Cited

U.S. PATENT DOCUMENTS

| | | | | |
|---|---|---|---|---|
| 8,405,912 | B2* | 3/2013 | Ohta | G02B 27/01 359/633 |
| 9,726,886 | B1* | 8/2017 | Kuo | B60K 35/00 |
| 2005/0156815 | A1* | 7/2005 | Aoki | G02B 27/0101 345/7 |
| 2011/0061482 | A1* | 3/2011 | Maruyama | F16H 25/2015 74/89.23 |
| 2013/0194518 | A1* | 8/2013 | Moussa | G02B 7/1821 349/11 |
| 2015/0070771 | A1* | 3/2015 | Jeon | G02B 27/0149 359/630 |
| 2016/0048026 | A1* | 2/2016 | Ogasawara | B60K 35/00 359/633 |
| 2016/0362002 | A1* | 12/2016 | Aoki | G02B 27/0101 |
| 2017/0336632 | A1* | 11/2017 | Ushida | B60K 35/00 |
| 2019/0107717 | A1* | 4/2019 | Heinrich | G02B 27/0149 |

* cited by examiner

ANGLE-ADJUSTING MECHANISM OF HEAD-UP DISPLAY

This application claims the benefit of U.S. Provisional Application No. 62/609,360, filed Dec. 22, 2017 and the benefit of People's Republic of China Application No. 201810210329.9, filed Mar. 14, 2018, the subject matters of which are incorporated herein by reference.

TECHNICAL FIELD

The invention relates in general to an angle-adjusting mechanism of a head-up display, and more particularly to an angle-adjusting mechanism which may reduce the volume of the head-up display.

BACKGROUND

The head-up display (HUD) is a device that projects required information in a visual line direction where the driver views the windshield. Thus, the driver can view the required information in the visual line direction when driving without lowering the head.

One type of the HUD is the windshield HUD. In this type of HUD, the clarity and position of the image projected onto the windshield may be determined by adjusting the tilt angle of the reflecting plate. However, in order to adjust the tilt angle of the reflecting plate according to the user's need, an adjusting mechanism may be employed, which may not effectively reduce the volume of the HUD instead.

SUMMARY

The invention is directed to an angle-adjusting mechanism of a head-up display, which may effectively reduce the volume of the HUD.

According to one embodiment, an angle-adjusting mechanism is provided. The angle-adjusting mechanism includes a reflecting assembly, a transmission assembly and a driving unit. The reflecting assembly includes a reflecting plate. The transmission assembly includes a transmission rod and a connecting element disposed on the transmission rod. The transmission assembly is connected to the reflecting assembly via the connecting element. The driving unit is configured to drive the transmission rod to move the reflecting assembly.

According to another embodiment, a head-up display is provided. The head-up display includes a base and an angle-adjusting mechanism disposed on the base. The angle-adjusting mechanism includes a reflecting assembly, a transmission assembly and a driving unit. The reflecting assembly includes a reflecting plate. The transmission assembly includes a transmission rod and a connecting element disposed on the transmission rod. The transmission assembly is connected to the reflecting assembly via the connecting element. The driving unit is configured to drive the transmission rod to move the reflecting assembly.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Detailed descriptions of the present invention are disclosed below with a number of embodiments. Although the present invention does not illustrate all possible embodiments, other embodiments not disclosed in the present invention are still applicable. Moreover, the dimension scales used in the accompanying drawings are not based on actual proportion of the product. Therefore, the specification and drawings are for explaining and describing the embodiment only, not for limiting the scope of protection of the present invention. Furthermore, in the drawings of the embodiments, some elements are omitted so that technical features of the present invention can be clearly illustrated. Designations common to the accompanying drawings and embodiments are used to indicate identical or similar elements.

In the description, term such as "the front direction", "the left and right direction" and "the bottom direction" of an element is not meant to represent a direction which the element faces right towards. Instead, these terms are used to describe the relative relationship with the element in the space.

Figure 1:
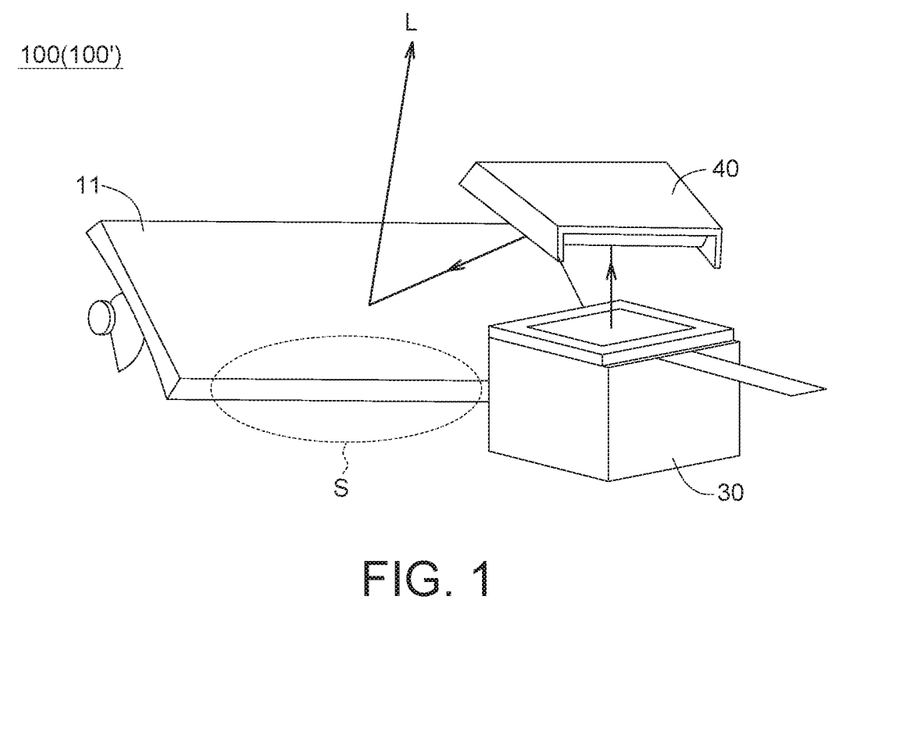
FIG. 1 is a schematic view showing the relative relationship among part components of the HUD according to embodiments of the present invention.

FIG. 1 is a schematic view showing the relative relationship among part components of the HUD 100 or 100' according to embodiments of the present invention. Referring to FIG. 1, the HUD 100 or 100' may be a device mounted under an instrument panel of a vehicle (such as a car). The HUD 100 or 100' may include a picture generating unit 30, a first reflecting plate 40 and a second reflecting plate 11. The picture generating unit 30 is configured to generate an image shown on the windshield. The light L for generate the image may be sequentially reflected by the first reflecting plate 40 and the second reflecting plate 11, so that the image can be projected onto the windshield. Furthermore, the tilt angle of the second reflecting plate 11 is configured to be adjustable so as to adjust the clarity and position of the image projected onto the windshield.

In order to adjust the tilt angle of the second reflecting plate 11, an angle-adjusting mechanism may be employed in the HUD 100 or 100'. In the present invention, the angle-adjusting mechanism may be disposed in the existing remaining space S inside the HUD 100 or 100' to optimize the internal space of the HUD 100 or 100'. Thus, there's no need to find an additional space to dispose the angle-adjusting mechanism, and the volume of the HUD 100 or 100' can be reduced. Here, the existing remaining space S may be a space which does not affect the traveling path of the light L and there's no element disposed in. The orientation of the existing remaining space S may substantially be in the front direction of the second reflecting plate 11, as shown in FIG. 1.

Figure 2:
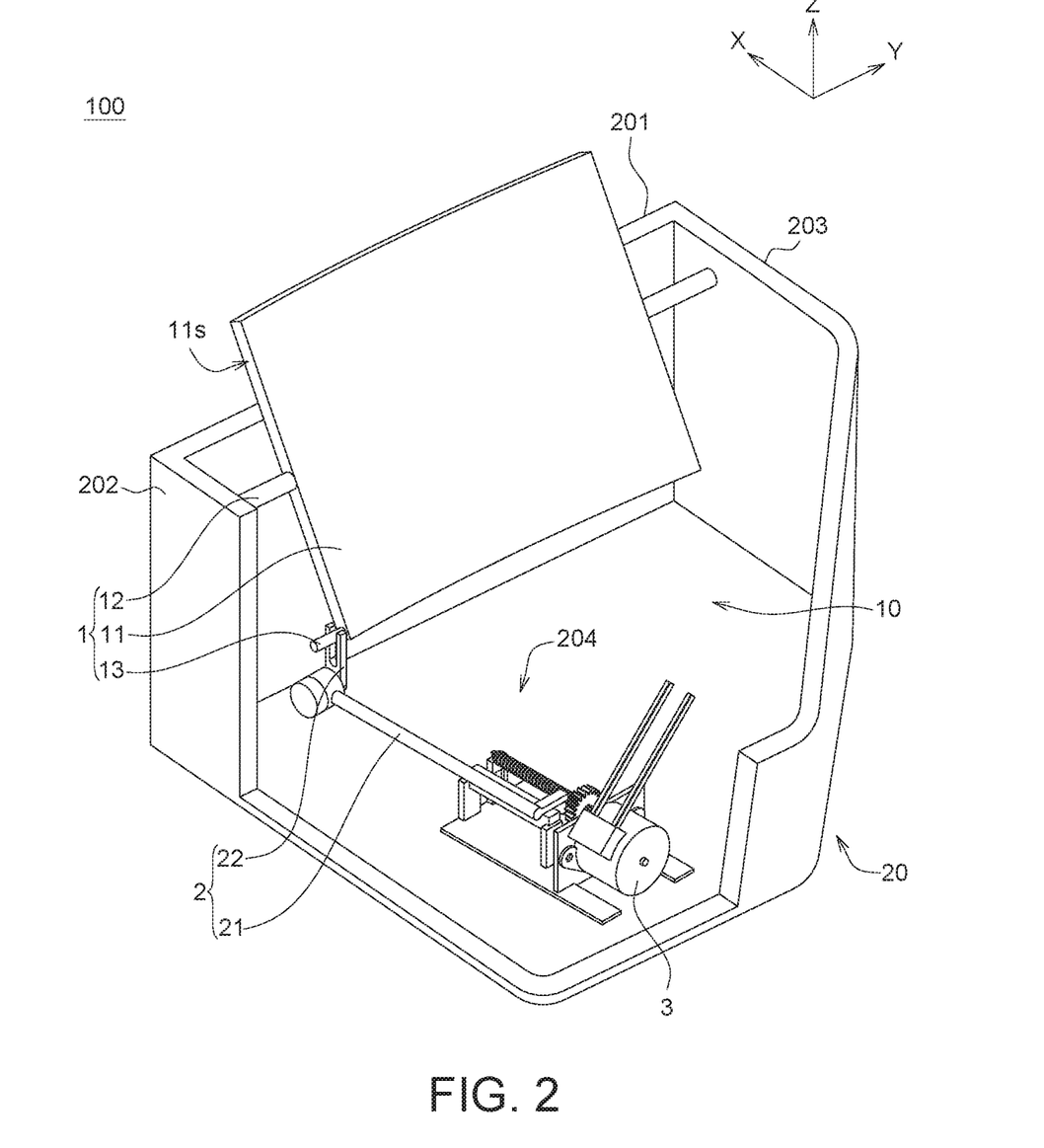
FIG. 2 is a perspective view of a HUD according to one embodiment of the present invention.

FIG. 2 is a perspective view of a HUD 100 according to one embodiment of the present invention. Referring to FIG. 2, the HUD 100 includes an angle-adjusting mechanism 10 and a base 20. The angle-adjusting mechanism 10 is disposed on the base 20. In FIG. 2, a portion of the side wall of the base 20 is cut away to show the appearance of the angle-adjusting mechanism 10 clearly.

The angle-adjusting mechanism 10 includes a reflecting assembly 1, a transmission assembly 2 and a driving unit 3. The base 20 includes a first side wall 201, a second side wall 202 and a third side wall 203. The second side wall 202 and the third side wall 203 are connected to the first side wall 201. The base 20 further includes a bottom surface 204 connected to the first side wall 201, the second side wall 202 and the third side wall 203. The transmission assembly 2 and the driving unit 3 are disposed on the bottom surface 204. The driving unit 3 is configured to drive the transmission assembly 2, such as a motor. The transmission assembly 2 is connected between the reflecting assembly 1 and the driving unit 3 for transmitting the kinetic energy produced by the driving unit 3 to the reflecting assembly 1, so as to move the reflecting assembly 1.

The reflecting assembly 1 includes a reflecting plate 11. The function of the reflecting plate 11 is described with reference to FIG. 1. As shown in FIG. 2, the driving unit 3 is disposed in the front direction of the reflecting plate 11. The front direction of the reflecting plate 11 may be described as: the position inside the inner space of the base 20 which has a smaller X-axis coordinate value than the reflecting plate 11. Here, the position of the driving unit 3 is in the existing remaining space S as shown in FIG. 1. For example, referring to FIG. 3, a top view of the HUD 100 of FIG. 2 is shown. The reflecting plate 11 may be disposed adjacent to the first side wall 201 of the base 20. The driving unit 3 may be disposed away from the first side wall 201 of the base 20. Through the configuration, the volume of the HUD 100 may be minimized.

As shown in FIG. 2, the transmission assembly 2 may include a transmission rod 21 and a connecting element 22. The transmission rod 21 horizontally extends towards the reflecting assembly 1. For example, the transmission rod 21 extends horizontally with the bottom surface 204 of the base 20 towards the reflecting assembly 1. The connecting element 22 is disposed on the transmission rod 21. The transmission assembly 2 is connected to the reflecting assembly 1 via the connecting element 22. When the driving unit 3 drives the transmission assembly 2, the reflecting assembly 1 may be moved so as to adjust the tilt angle of the reflecting plate 11.

In one embodiment, the reflecting assembly 1 may include a rotating shaft 12. The rotating shaft 12 may be disposed between the second side wall 202 and the third side wall 203 of the base 20. When the driving unit 3 drives the transmission assembly 2, the reflecting plate 11 rotates about the rotating shaft 12, so as to adjust the tilt angle of the reflecting plate 11.

Figure 3:
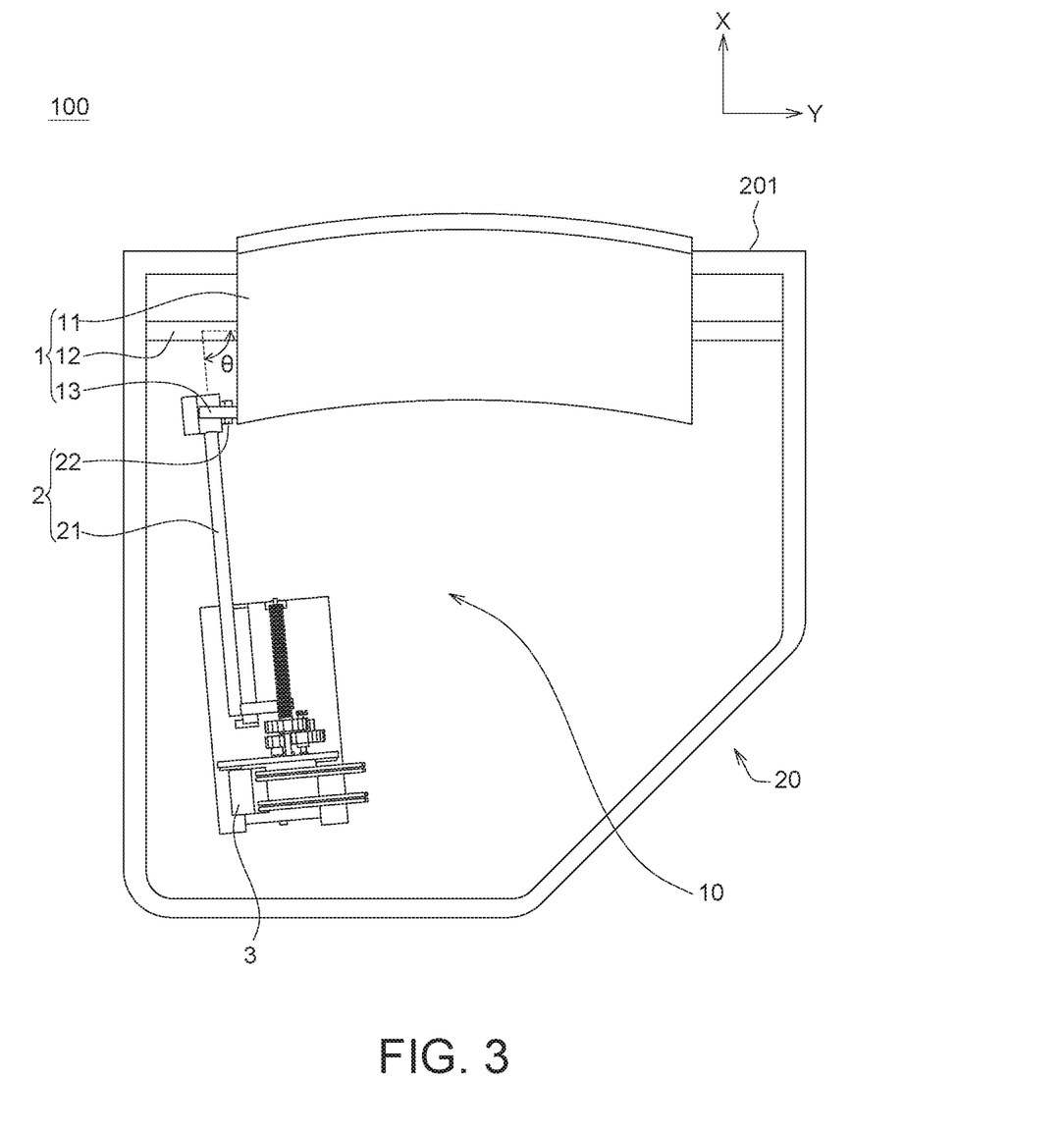
FIG. 3 is a top view of the HUD of FIG. 2.

As shown in FIG. 3, there is an angle θ existing between a line parallel to the rotating shaft 12 and the transmission rod 21, wherein the angle θ may be smaller than 90 degrees. In some embodiments, the angle θ may be equal to, smaller than or larger than 90 degrees according to the shape of the base 20 of the HUD 100. That is, by placing the transmission rod 21 which horizontally extends towards the reflecting assembly 1, the driving unit 3 may be disposed at any position in the front direction of the reflecting plate 11.

Figure 4:
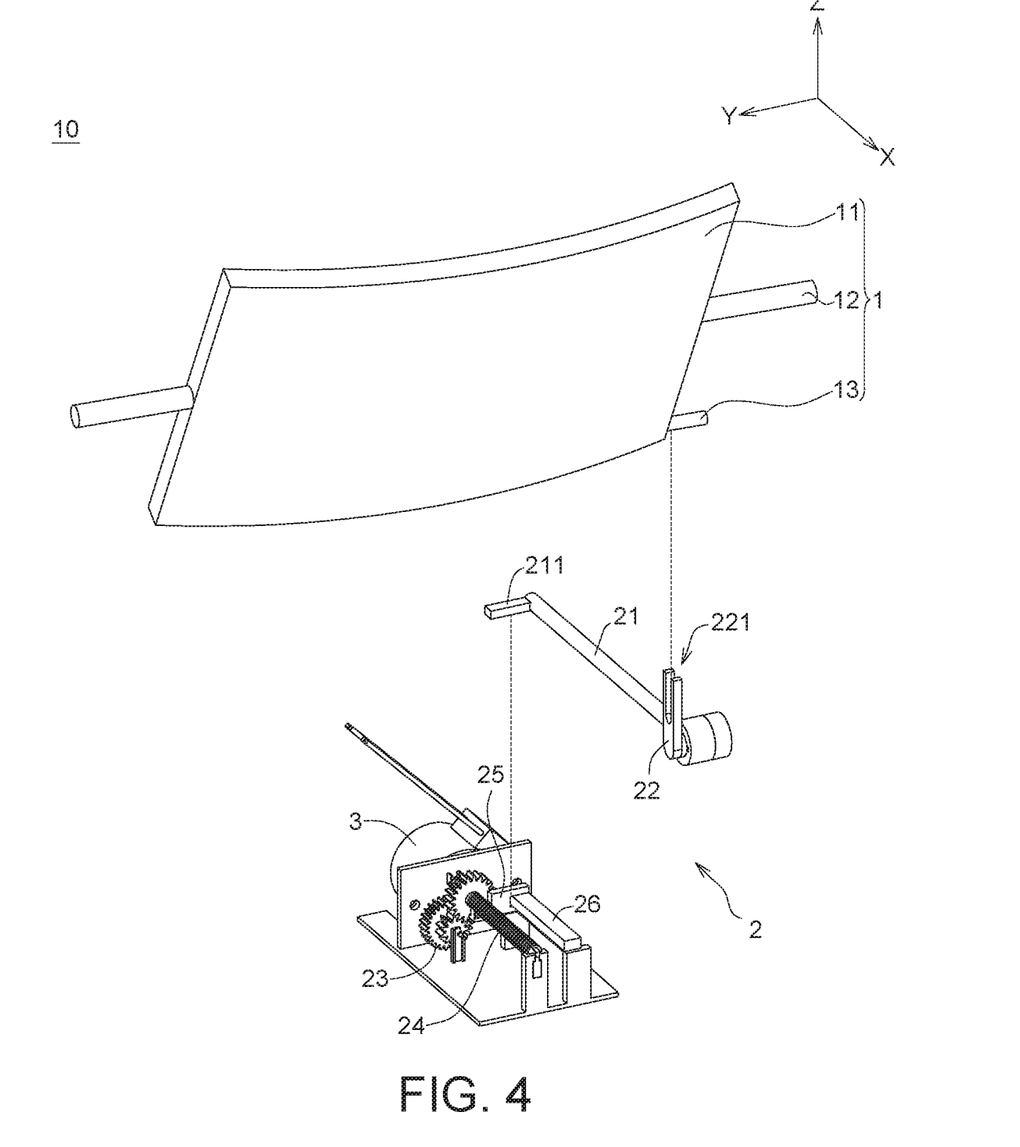
FIG. 4 is an exploded view of the angle-adjusting mechanism according to one embodiment of the present invention.

Referring to FIG. 4, an exploded view of the angle-adjusting mechanism 10 according to one embodiment of the present invention is shown. The connecting element 22 may have a guiding groove 221. The reflecting assembly 1 may include a guiding pin 13. In one embodiment, the guiding pin 13 may be disposed on one side 11s (designated in FIG. 2) of the reflecting plate 11. Here, the guiding pin 13 is slidably disposed in the guiding groove 221. The present invention is not limited thereto. For example, in another embodiment, the connecting element 22 may be a guiding pin, while the reflecting assembly 1 may have a similar guiding groove.

Figure 5A:
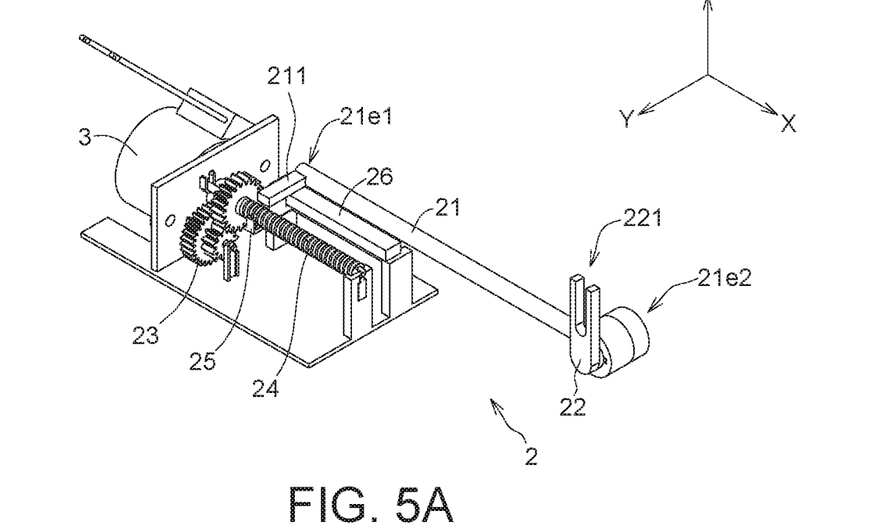
FIG. 5A is a schematic view (I) showing the motion of partial structure of the angle-adjusting mechanism of FIG. 4 in a perspective view.

FIG. 5A is a schematic view (I) showing the motion of partial structure of the angle-adjusting mechanism 10 of FIG. 4 in a perspective view. Referring to FIGS. 4 and 5A, when the driving unit 3 drives the transmission assembly 2, the transmission rod 21 may have a linear motion. For example, the transmission assembly 2 may include a screw 24, a nut 25 and a guiding member 26. An extending direction of the screw 24 is parallel to the transmission rod 21 and the guiding member 26. The nut 25 engages with the screw 24, and is connected to the guiding member 26. The transmission rod 21 may be connected to the nut 25, and be co-acted with the nut 25. Specifically, the transmission rod 21 may include a positioning member 211 fastened with the nut 25. Thus, the transmission rod 21 is co-acted with the nut 25. The transmission rod 21 and the nut 25 cannot move relative to each other.

The driving unit 3 may drive the screw 24 to rotate around the X-axis. When the driving unit 3 drives the transmission assembly 2, the screw 24 rotates so that the nut 25 has a linear motion along the X-axis on the guiding member 26 to move the transmission rod 21 linearly along the X-axis.

Furthermore, in one embodiment, the transmission assembly 2 may further include a gear assembly 23. The gear assembly 23 may be connected between the driving unit 3 and the screw 24. That is, the kinetic energy produced by the driving unit 3 is transmitted sequentially through the gear assembly 23, the screw 24, the nut 25, the transmission rod 21 and the connecting element 22 to the reflecting assembly 1. Here, the designer may determine a suitable reduction ratio to adjust the design of the gear assembly 23.

As shown in FIG. 5A, the transmission rod 21 may include a first end 21e1 and a second end 21e2 opposite to the first end 21e1 along the X-axis. The positioning member 211 of the transmission rod 21 may be disposed on the first end 21e1, and the connecting element 22 may be disposed on the second end 21e2, but the present invention is not limited thereto.

As shown in FIGS. 4 and 5A, the guiding groove 221 of the connecting element 22 may be a linear groove. When the driving unit 3 drives the transmission assembly 2, the guiding pin 13 of the reflecting assembly 1 may slide in the guiding groove 221. Under such a structure, the transmission rod 21, the connecting element 22 and the guiding pin 13 may constitute a linkage mechanism, so that the reflecting plate 11 may rotate about the rotating shaft 12 to adjust the tilt angle of the reflecting plate 11. However, the present invention is not limited thereto.

Figure 5B:
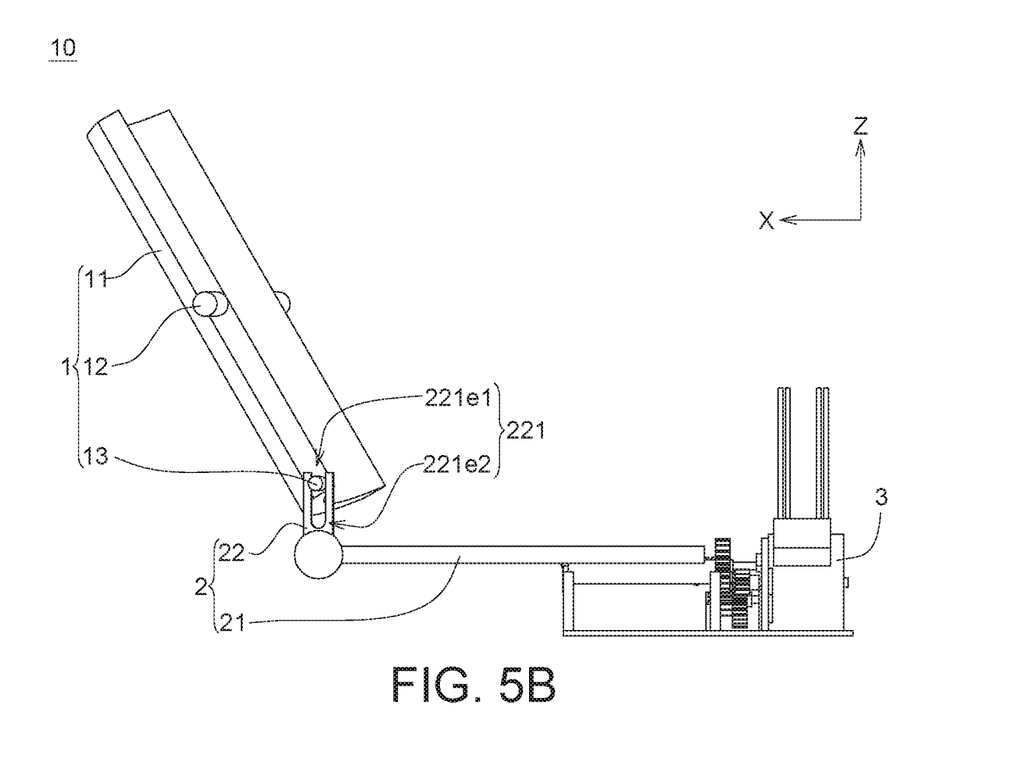
FIG. 5B is a schematic view (I) showing the motion of the angle-adjusting mechanism of FIG. 4 in a side view.
Figure 6A:
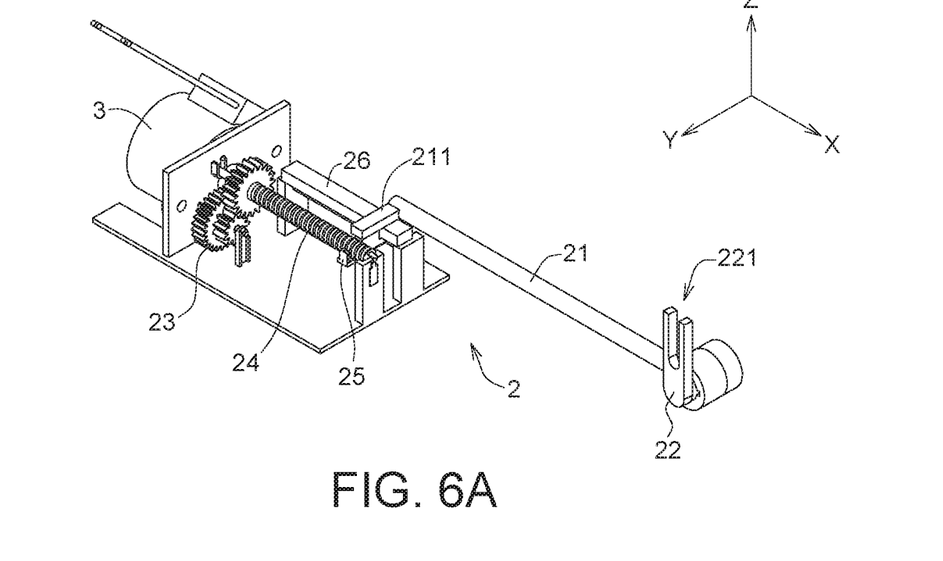
FIG. 6A is a schematic view (II) showing the motion of partial structure of the angle-adjusting mechanism of FIG. 4 in a perspective view.
Figure 6B:
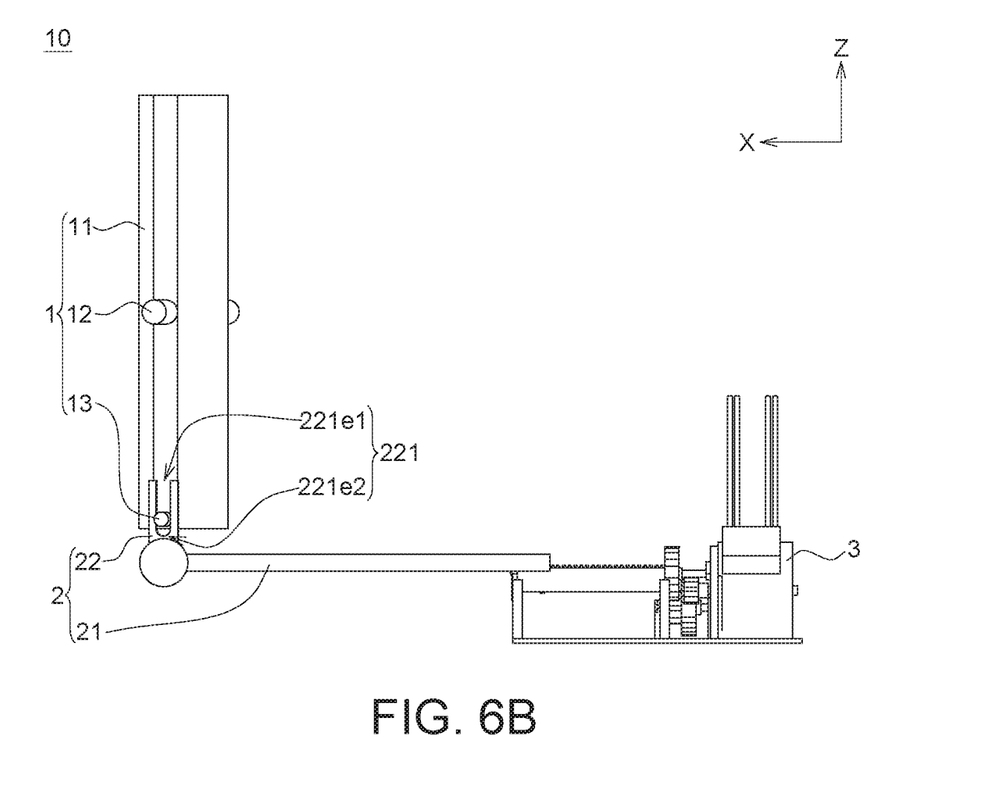
FIG. 6B is a schematic view (II) showing the motion of the angle-adjusting mechanism of FIG. 4 in a side view.

FIG. 5B is a schematic view (I) showing the motion of the angle-adjusting mechanism 10 of FIG. 4 in a side view. FIG. 6A is a schematic view (II) showing the motion of partial structure of the angle-adjusting mechanism 10 of FIG. 4 in a perspective view. FIG. 6B is a schematic view (II) showing the motion of the angle-adjusting mechanism 10 of FIG. 4 in a side view.

Referring to FIG. 5A and FIG. 5B, FIG. 5B shows that the reflecting plate 11 is located at a first position. At this time, the guiding pin 13 is located at a first end 221e1 of the guiding groove 221. When the driving unit 3 drives the transmission assembly 2, the position of the guiding pin 13 in the guiding groove 221 may be changed.

Referring to FIG. 6A and FIG. 6B, FIG. 6B shows that the reflecting plate 11 is located at a second position. When the driving unit 3 drives the transmission assembly 2, the transmission rod 21 linearly moves along a positive direction of the X-axis, so that the guiding pin 13 is driven to slide towards a second end 221e2 of the guiding groove 221. Thus, the reflecting plate 11 may rotate about the rotating shaft 12 to adjust the tilt angle of the reflecting plate 11.

Furthermore, in these embodiments, the configuration of the above transmission rod 21, the guiding groove 221 and the guiding pin 13 may be applied to different size of the reflecting plate 11. In detail, the purpose of being applied different size of the reflecting plate 11 may be achieved by adjusting an angle between the guiding groove 221 and the transmission rod 21.

Figure 7A:
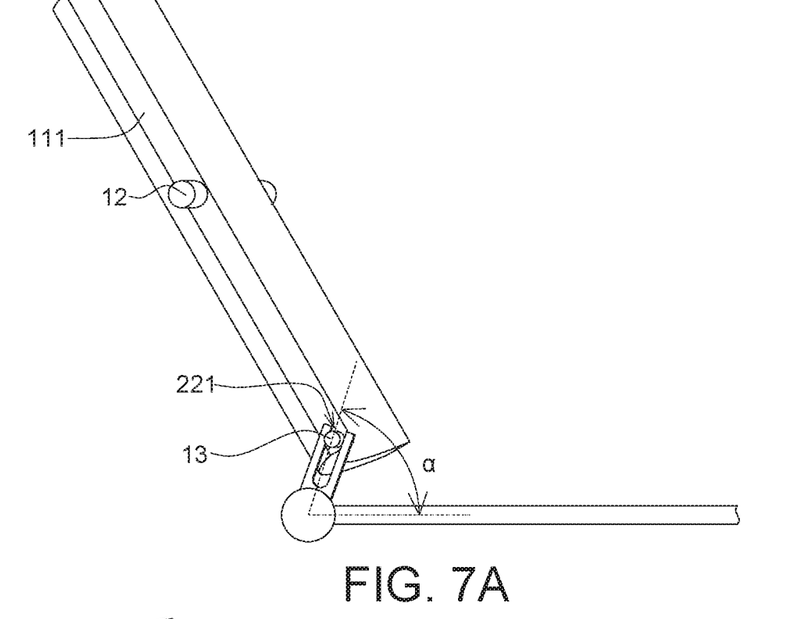
FIGS. 7A-7D are schematic views showing the motion of different size of reflecting plate according to embodiments of the present invention.
Figure 7B:
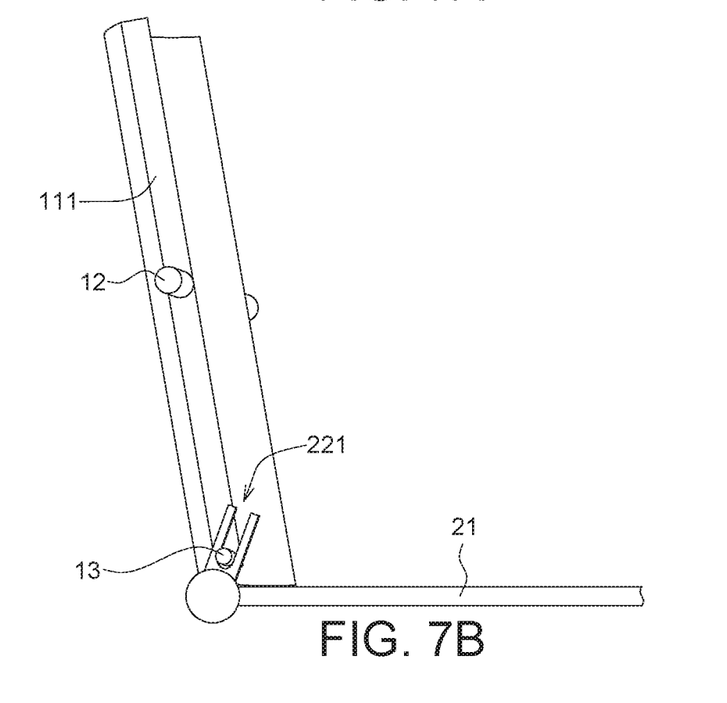
Figure 7C:
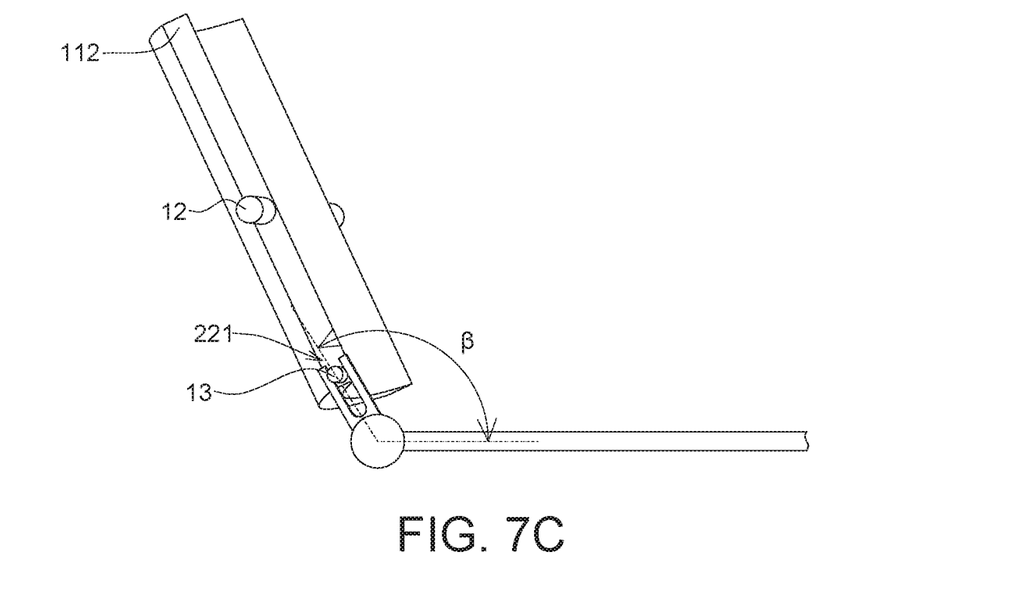
Figure 7D:
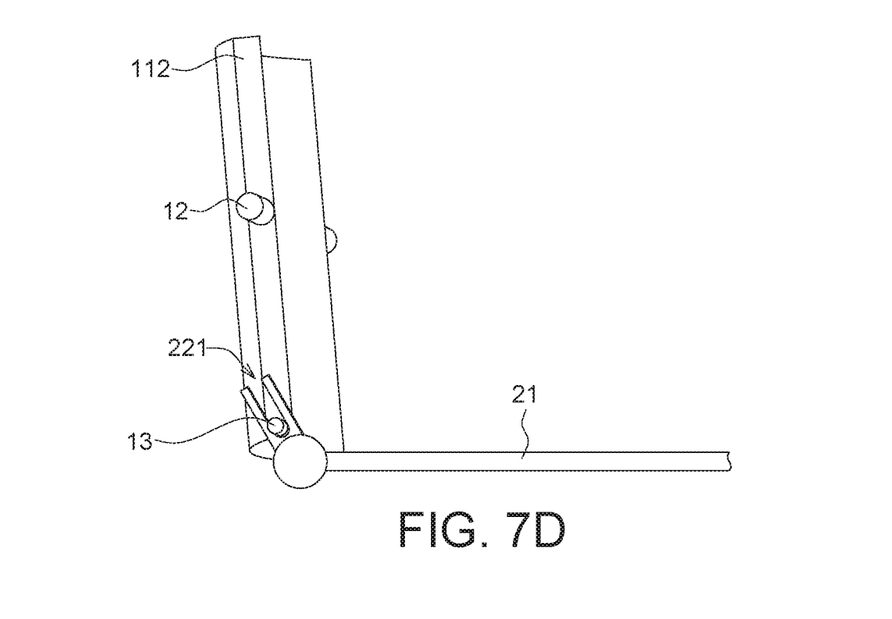

FIGS. 7A-7D are schematic views showing the motion of different size of reflecting plate 111, 112 according to embodiments of the present invention. The size of the reflecting plate 111 of FIG. 7A and FIG. 7B is larger than the size of the reflecting plate 112 of FIG. 7C and FIG. 7D. In FIG. 7A and FIG. 7B, the angle between the guiding groove 221 and the transmission rod 21 may be adjusted to α for the reflecting plate 111 with larger size. In FIG. 7C and FIG. 7D, the angle between the guiding groove 221 and the transmission rod 21 may be adjusted to β for the reflecting plate 112 with smaller size. The value of angle α is smaller than the value of angle β, so that the tilt angle of the reflecting plate 111 and the reflecting plate 112 may be adjusted in the same range. That is, in the embodiments of the present invention, the angle between the guiding groove 221 and the transmission rod 21 is adjustable for different size of the reflecting plate.

Figure 8:
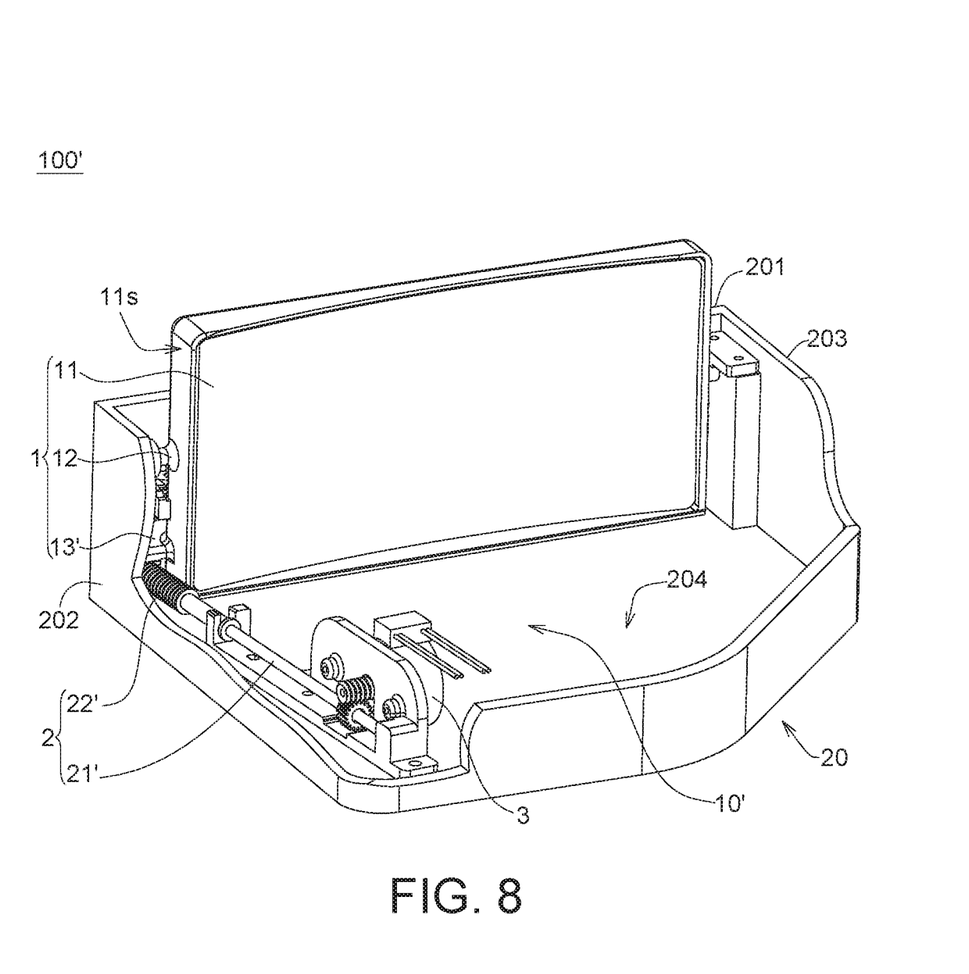
FIG. 8 is a perspective view of a HUD according to another embodiment of the present invention.
Figure 9:
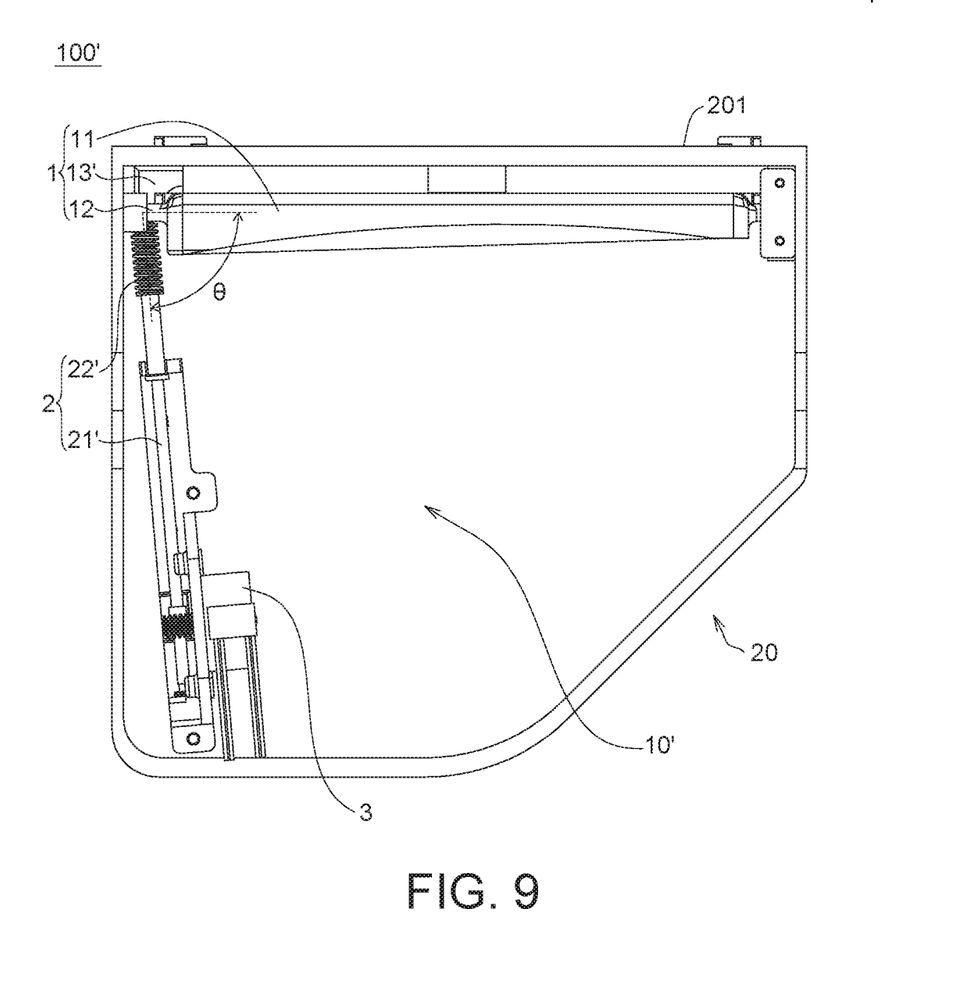
FIG. 9 is a top view of the HUD of FIG. 8.

FIG. 8 is a perspective view of a HUD 100' according to another embodiment of the present invention. FIG. 9 is a top view of the HUD 100' of FIG. 8. The HUD 100' includes an angle-adjusting mechanism 10' and a base 20. The angle-adjusting mechanism 10' is disposed on the base 20.

The angle-adjusting mechanism 10' includes a reflecting assembly 1, a transmission assembly 2 and a driving unit 3. In the present embodiment, the position of the driving unit 3 is in the existing remaining space S as shown in FIG. 1. Therefore, the volume of the HUD 100' may be minimized.

In the present embodiment, the relative relationship among part components of the HUD 100' is similar to that of the HUD 100 of the embodiment of FIG. 2, and it is not repeated here.

Figure 10:
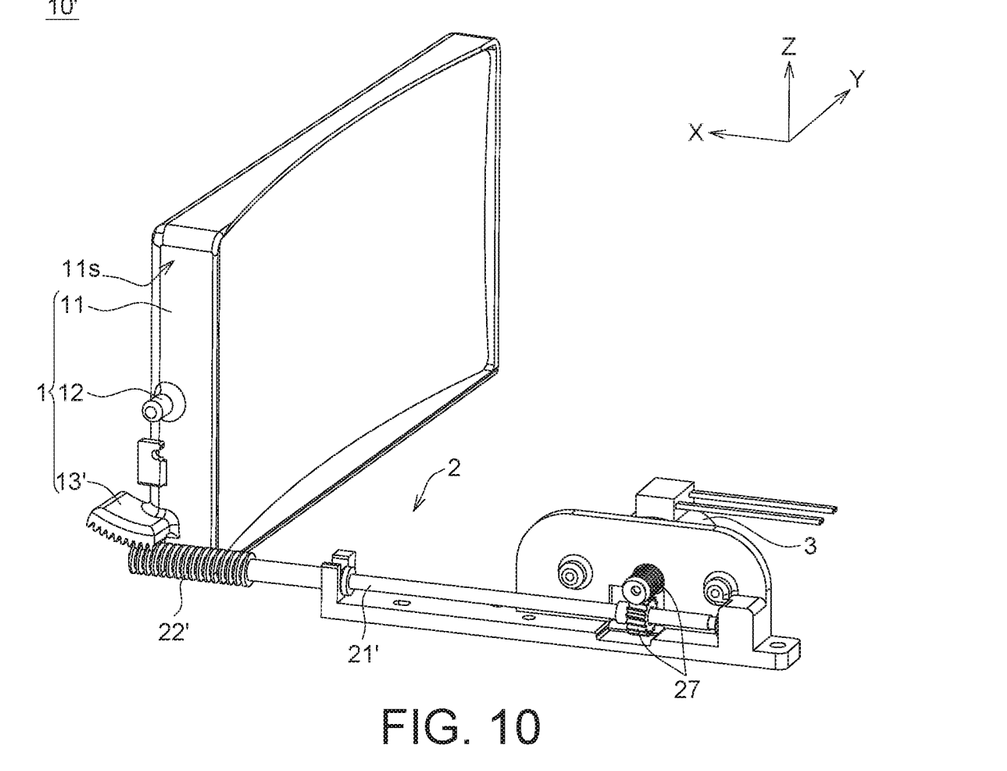
FIG. 10 is a perspective view of the angle-adjusting mechanism according to another embodiment of the present invention.

FIG. 10 is a perspective view of the angle-adjusting mechanism 10' according to another embodiment of the present invention. Referring to FIGS. 8, 9 and 10, the transmission assembly 2 includes a transmission rod 21' and a connecting element 22'. One difference between the HUD 100' of the present embodiment and the HUD 100 of the embodiment of FIG. 2 is that in the present embodiment, when the driving unit 3 drives the transmission assembly 2, the transmission rod 21' may have a rotary motion. In one embodiment, the transmission assembly 2 may further include a worm assembly 27. The worm assembly 27 may be connected between the driving unit 3 and the transmission rod 21'. That is, the kinetic energy produced by the driving unit 3 is transmitted sequentially through the worm assembly 27, the transmission rod 21' and the connecting element 22' to the reflecting assembly 1. Here, the designer may determine a suitable reduction ratio to adjust the design of the transmission mechanism between the driving unit 3 and the transmission rod 21'.

The connecting element 22' may be a worm. The reflecting assembly 1 may include a worm gear portion 13'. In one embodiment, the worm gear portion 13' may be disposed on one side 11s of the reflecting plate 11. The worm gear portion 13' may be curved in shape, and the length of the curved shape defines the range of the tilt angle of the reflecting plate 11. Here, the worm gear portion 13' may engage with the worm (i.e., the connecting element 22').

In one embodiment, the connecting element 22' may be connected to the transmission rod 21', and be co-acted with the transmission rod 21'. That is, the connecting element 22' and the transmission rod 21' cannot move relative to each other. Therefore, when the driving unit 3 drives the transmission assembly 2 so that the transmission rod 21' rotates around the X-axis, the connecting element 22' also rotates with the transmission rod 21'. Thus, the connecting element 22' may drive the worm gear portion 13', which engages with the connecting element 22', to make the reflecting plate 11 rotate about the rotating shaft 12, so as to adjust the tilt angle of the reflecting plate 11. However, the present invention is not limited thereto.

Figure 11:
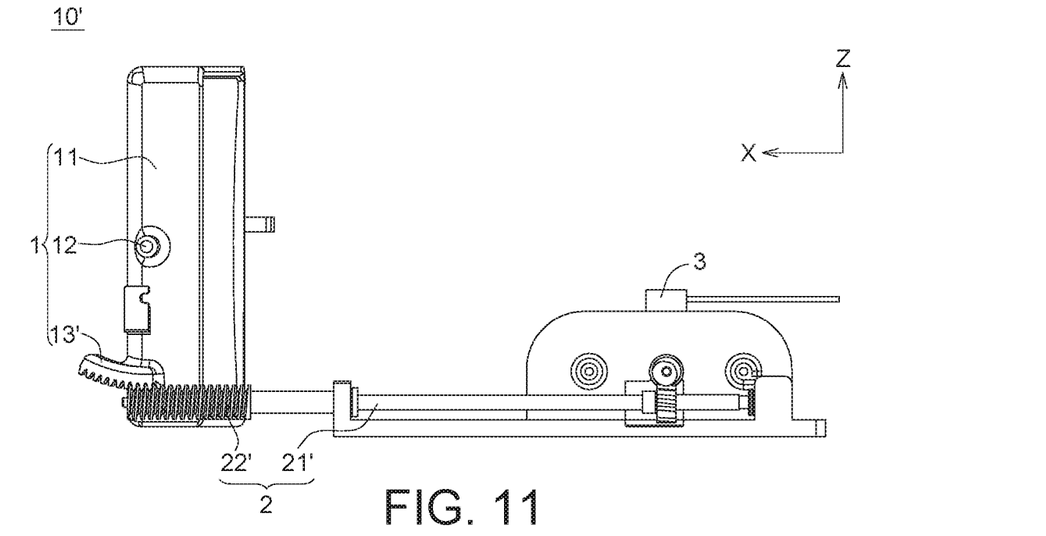
FIG. 11 is a schematic view (I) showing the motion of the angle-adjusting mechanism of FIG. 10 in a side view.
Figure 12:
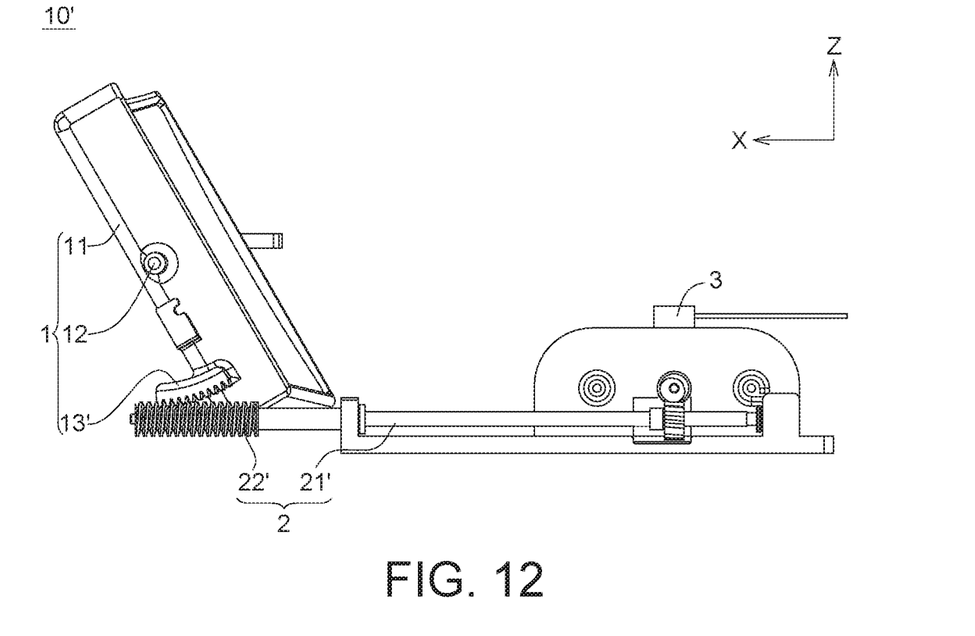
FIG. 12 is a schematic view (II) showing the motion of the angle-adjusting mechanism of FIG. 10 in a side view.

FIG. 11 is a schematic view (I) showing the motion of the angle-adjusting mechanism 10' of FIG. 10 in a side view. FIG. 12 is a schematic view (II) showing the motion of the angle-adjusting mechanism 10' of FIG. 10 in a side view.

Referring to FIG. 11, FIG. 11 shows that the reflecting plate 11 is located at a first position. When the driving unit 3 drives the transmission assembly 2, the transmission rod 21' and the connecting element 22' rotate around the X-axis to move the worm gear portion 13', which engages with the connecting element 22'. Thus, the reflecting plate 11 may rotate about the rotating shaft 12 so that the tilt angle of the reflecting plate 11 may be changed. As shown in FIG. 12, the reflecting plate 11 is changed from the first position shown in FIG. 11 to a second position.

Furthermore, in these embodiments, the configuration of the above transmission rod 21', the connecting element 22' and the worm gear portion 13' may be applied to different size of the reflecting plate 11.

Figure 13:
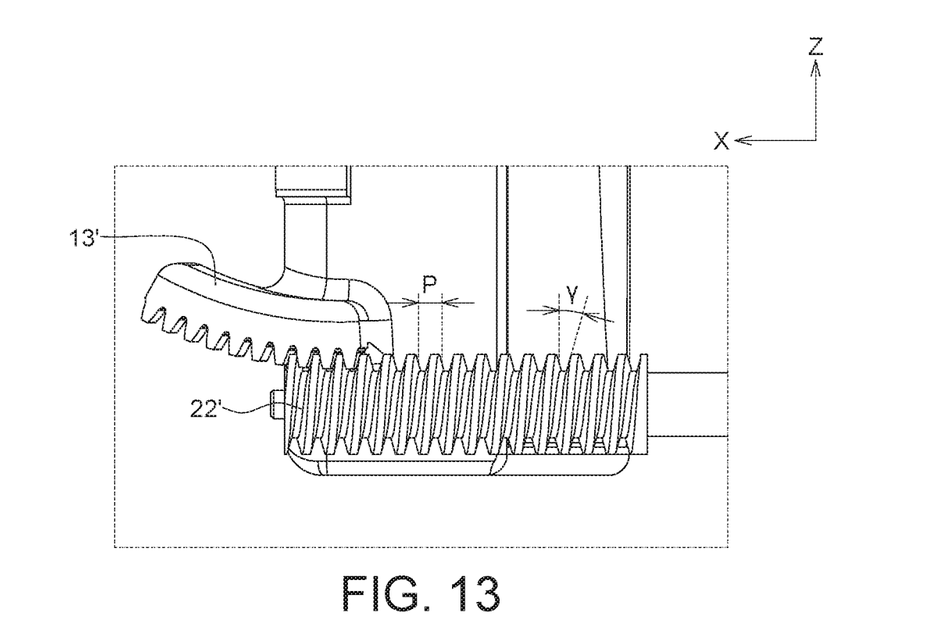
FIG. 13 is a partial enlarged view of the angle-adjusting mechanism of FIG. 10.

Referring to FIG. 13, a partial enlarged view of the angle-adjusting mechanism 10' of FIG. 10 is shown. The purpose of being applied different size of the reflecting plate 11 may be achieved by adjusting the pitch P and the helix angle γ of the worm (i.e., the connecting element 22'). In detail, under a condition that the pitch circles of the worms are identical in size, the worm with longer pitch P and larger helix angle γ may be used to drive the reflecting plate 11 with a larger size. In contrast, the worm with shorter pitch P and smaller helix angle γ may be used to drive the reflecting plate 11 with a smaller size.

According to the angle-adjusting mechanism 10, 10' and the HUD 100, 100' provided in the above embodiments, the driving unit is disposed in the existing remaining space S as shown in FIG. 1, such as in a position in the front direction of the reflecting plate or a position away from the first side wall of the base, wherein the reflecting plate is disposed adjacent to the first side wall. The space inside the HUD 100, 100' may be effectively used, and there's no need to find an additional space to dispose the angle-adjusting mechanism. Thus, the volume of the HUD 100, 100' may be minimized. Moreover, the angle-adjusting mechanism 10, 10' and the HUD 100, 100' provided in the above embodiments may further be applied to different size of reflecting plate.

It will be apparent to those skilled in the art that various modifications and variations can be made to the disclosed embodiments. It is intended that the specification and examples be considered as exemplary only, with a true scope of the invention being indicated by the following claims and their equivalents.

What is claimed is:

1. An angle-adjusting mechanism comprising:
   a reflecting assembly comprising a reflecting plate;
   a transmission assembly comprising a transmission rod and a connecting element disposed on the transmission rod, wherein the transmission assembly is connected to the reflecting assembly via the connecting element; and
   a driving unit configured to drive the transmission rod to move the reflecting assembly,
   wherein the connecting element has a guiding groove, the reflecting assembly further comprises a guiding pin disposed on one side of the reflecting plate, and the guiding pin is slidably disposed in the guiding groove,
   wherein an angle between the guiding groove and the transmission rod is adjustable for different size of the reflecting plate.

2. The angle-adjusting mechanism according to claim 1, wherein the reflecting assembly further comprises a rotating shaft, and when the driving unit drives the transmission rod, the reflecting plate rotates about the rotating shaft.

3. The angle-adjusting mechanism according to claim 2, wherein an angle between a line parallel to the rotating shaft and the transmission rod is smaller than 90 degrees.

4. The angle-adjusting mechanism according to claim 1, wherein when the driving unit drives the transmission rod, the transmission rod has a linear motion.

5. The angle-adjusting mechanism according to claim 1, wherein the transmission assembly further comprises a screw, a nut and a guiding member, the nut engages with the screw and is connected to the guiding member, the transmission rod is connected to the nut to be co-acted with the nut, and when the driving unit drives the transmission rod, the nut has a linear motion on the guiding member.

6. The angle-adjusting mechanism according to claim 1, wherein when the driving unit drives the transmission rod, the transmission rod has a rotary motion.

7. A head-up display comprising:
   a base; and
   an angle-adjusting mechanism disposed on the base, the angle-adjusting mechanism comprising:
   a reflecting assembly comprising a reflecting plate;
   a transmission assembly comprising a transmission rod and a connecting element disposed on the transmission rod, wherein the transmission assembly is connected to the reflecting assembly via the connecting element; and
   a driving unit configured to drive the transmission rod to move the reflecting assembly,
   wherein the connecting element has a guiding groove, the reflecting assembly further comprises a guiding pin disposed on one side of the reflecting plate, and the guiding pin is slidably disposed in the guiding groove,
   wherein an angle between the guiding groove and the transmission rod is adjustable for different size of the reflecting plate.

8. The head-up display according to claim 7, wherein the reflecting assembly further comprises a rotating shaft, and when the driving unit drives the transmission rod, the reflecting plate rotates about the rotating shaft.

9. The head-up display according to claim 7, wherein the transmission assembly further comprises a screw, a nut and a guiding member, the nut engages with the screw and is connected to the guiding member, the transmission rod is connected to the nut to be co-acted with the nut, and when the driving unit drives the transmission rod, the nut has a linear motion on the guiding member.

* * * * *